United States Patent Office 3,361,841
Patented Jan. 2, 1968

3,361,841
BINDER COMPOSITION COMPRISING A MIXTURE OF A FURAN RESIN AND AN AROMATIC HYDROCARBON-ALDEHYDE CONDENSATE
Guido Max Rudolf Lorentz, Oes, Post Office Espa, near Butzbach, and Walter Füller, Frankfurt am Main, Germany, assignors to Farbwerke Hoechst Aktiengesellschaft vormals Meister Lucius & Brüning, Frankfurt am Main, Germany, a corporation of Germany
No Drawing. Filed Sept. 26, 1966, Ser. No. 581,682
10 Claims. (Cl. 260—823)

ABSTRACT OF THE DISCLOSURE

A furan condensation resin derived from precursors such as furfuryl alcohol, furfural, furyl acrolein, an aldehyde and combinations thereof, together with a condensation product of a mono-nuclear hydrocarbon such as toluene or xylene with formaldehyde, or a binuclear aromatic hydrocarbon such as naphthalene with formaldehyde are reacted to produce a hardenable composition. Shaped bodies made from this composition containing fillers such as coke powder, quartz, sand, etc., show improved non-shrink behavior. As an optional additive for the aromatic hydrocarbon, a phenol may be used of which 4,4'-dihydroxy-2,2-diphenylpropane is a preferred illustration.

---

The present application is a continuation-in-part of application Ser. No. 285,215 filed June 4, 1963, now abandoned.

The present invention relates to a hardenable synthetic resin composition to be used as binder for the manufacture of acid-proof materials for constructions. The present invention particularly relates to a binder for acid-proof and chemically resistant cements which binder does not shrink during hardening.

In the first place, hardenable furan resins and hardenable phenol resins, so-called resols, are used as binders for acid-proof construction materials. When being used, the aforesaid resins are mixed with a filler, for example quartz sand, graphite powder, coke powder, asbestos, rutile, barium sulfate, and an acid hardener, whereupon they harden to a solid, pressure-resistant body having a high resistance to the action of chemical substances. Suitable hardeners are acid compounds such as mineral acids, especially however p-toluene-sulfonic acid, p-toluene-sulfochloride, naphthalene-disulfonic acid, p-toluene-sulfonic acid ethyl ester and the like.

The furan resins have the disadvantage that they shrink during hardening, that is to say their volume decreases whereby tensions occur in the construction built therewith. Moreover, they have a little resistance to alkalies.

Phenol resins often cause skin irritations with persons handling them.

It is known to harden furan resins together with phenol resins. In this case, the resistance to chemicals of the hardened resin compositions is considerably better than that of the individual components. The shrinkage of the furan resins cannot be avoided, however, by the joined processing with phenol resins. Moreover, the mixtures still have the skin irritating properties of the phenol resins contained therein.

Now, we have found hardenable synthetic resin compositions suitable as binders for acid-proof building materials, which compositions do not shrink during hardening and do not cause any irritation of the skin.

The hardenable synthetic resin compositions according to the invention contain as component A 90 to 60 parts by weight of a furan resin and as component B 10 to 40 parts by weight of a condensation product obtained from an aromatic, mono- or binuclear hydrocarbon and formaldehyde in the presence of a strong acid and having an oxygen content of at least 5% and a sulfur content of less than 0.3%.

It is surprising that synthetic resin compositions of the aforesaid type can be hardened in the cold under the action of acid catalysts and with co-condensation, although condensation products of aromatic hydrocarbons and formaldehyde alone are not liable to acid hardening.

Furan resins are resinous products obtained by condensation of furfuryl alcohol, furfural or of furfural with aldehydes, especially acetaldehyde. The manufacture of condensation resins from furfuryl alcohol in the presence of sulfuric acid is described, for example, in Houben-Weyl, 4th ed. 1963, vol. XIV/2, p. 636, Georg Thieme Verlag, Stuttgart.

Reference is also made to U.S. Patent 2,471,600 where the manufacture of resins of this type is likewise described. Further references to the manufacture and hardening of furan resins are to be found in Dunlop-Peters "The Furans," p. 220 to 224 and 783 et seq., Reinhold Publishing Corporation, New York. The manufacture of furyl acrolein resins is described in U.S. Patent 3,063,959, p. 1, first column, lines 50 et seq.

The manufacture of condensation resins from aromatic hydrocarbons and formaldehyde is disclosed in Houben-Weyl, 4th ed., vol. XIV/2, p. 313 et seq. Formaldehyde is condensed with the aromatic hydrocarbon at about 100° C. in the presence of a strong acid, advantageously sulfuric acid.

To prepare the compositions according to the invention resins obtained by condensation of formaldehyde with toluene, xylene, mesitylene or naphthalene are especially suitable. These resins may be modified with phenols. Up to 30 parts by weight of a phenol may be added to 100 parts of the aromatic hydrocarbon. Especially valuable products are obtained when modifying with 4,4'-dihydroxy-2,2-diphenylpropane (Bisphenol A). Other phenols, for example phenol, o-cresol, or 4,4'-dihydroxy-diphenyl-methane may also be used.

The hardenable compositions according to the invention are obtained by mixing the furan resin with the resin from formaldehyde and aromatic hydrocarbon and homogenizing the mixture obtained, for example with stirring, shaking or a similar procedure. Sometimes, it is advantageous to add to the furan resin the resin from the aromatic hydrocarbon and formaldehyde in the form of a solution in an aromatic hydrocarbon, preferably benzene, toluene or xylene. After mixing the components, the solvent can be eliminated by distillation.

The following examples serve to illustrate the invention but they are not intended to limit it thereto, the parts being by weight unless otherwise stated.

Example 1

70 parts of furan resin obtained by condensation of furfuryl alcohol in the presence of sulfuric acid and 30 parts of a 40% solution of a condensation product from toluene and formaldehyde in toluene were mixed and the solvent was distilled off. 100 parts of the mixture obtained contained 85 parts of furan resin and 15 parts of the resin from aromatic hydrocarbon and formaldehyde. The resin from toluene and formaldehyde contained 16% of oxygen and less than 0.3% of sulfur.

60 parts of the resin composition were mixed with 100 parts of a filler consisting of 96 parts of coke powder having a particle size of up to 0.4 millimeter and 4 parts of p-toluene-sulfonic acid. The cement obtained had a working time of 30 minutes and a hardening time of 24 hours (to a Shore hardness D of about 40). A shaped body made from the cement shrunk slightly during the first 10 days but after 15 days it had recovered its original length.

Example 2

70 parts of the furan resin described in Example 1 were mixed with 30 parts of a condensation product from xylene and formaldehyde having an oxygen content of 11% and a sulfur content of less than 0.3%. A cement was prepared from 100 parts of the resin composition and 375 parts of quartz sand having a particle size of up to 1 millimeter and containing 3%, calculated on the sand, of naphthalene-disulphonic acid. The properties of the cement were analogous to those of the cement of Example 1.

Example 3

85 parts of the furan resin of Example 1 were mixed with 15 parts of a mixture of 90 parts of a condensation product from a xylene-formaldehyde resin and 10 parts of 4,4'-dihydroxy-2,2-diphenyl-propane (Bisphenol A).

A cement was prepared from 25 parts of the resin mixture obtained and 100 parts of a filler consisting of 97 parts of quartz powder and 3 parts of p-toluenesulfonic acid. The working time and the hardening properties of the cement were analogous to those of the cement of Examples 1 and 2.

The resin composition could also be hardened in the heat by adding 2 parts of p-toluenesulfonic acid ethyl ester instead of 3 parts of p-toluenesulfonic acid. The hardening commenced at 70° C. When the hardening temperature was raised to 150° C. an acid hardener could be dispensed with.

Example 4

70 parts of a condensation product from furfuryl alcohol were diluted with 30 parts of furfural. 70 parts of the furan resin obtained were mixed with 30 parts of a solution of 45% strength of a condensation product from xylene and formaldehyde in xylene and the solvent was eliminated. The resin composition obtained contained 83.5 parts of furan resin and 16.5 parts of the condensation product from xylene and formaldehyde having an oxygen content of 11% and a sulfur content of less than 0.3%.

A cement was prepared from 60 parts of the resin composition obtained and 100 parts of a filler consisting of 96 parts of coke powder having a particle size of up to 0.4 millimeter and 4 parts of p-toluenesulfonic acid. The cement had a working time of 30 minutes and a hardening time of 24 hours to a Shore hardness D of about 40.

Example 5

50 parts of a furyl-acrolein resin, obtained by condensation of furfural and acetaldehyde, were mixed with 50 parts of a 45% solution of a condensation product from xylene and formaldehyde in xylene and the solvent was distilled off. The resin composition freed from the solvent contained 69 parts of furan resin and 31 parts of the condensation product from xylene and formaldehyde. A cement was prepared by mixing 100 parts of the aforesaid resin composition with 375 parts of a filler consisting of quartz sand having a particle size of up to 1 millimeter and 3% of naphthalene-disulfonic acid as hardener. The properties of the cement were similar to those of the cements of the preceding examples.

Example 6

55 parts of the furan resin specified in Example 4 were mixed with a 45% solution of a condensation product from mesitylene and formaldehyde in benzene and the solvent was distilled off. The remaining resin composition contained 71.5 parts of the furan resin and 28.5 parts of the condensation product from mesitylene and formaldehyde having an oxygen content of 12.3% and a sulfur content of less than 0.3%. A cement was prepared from 100 parts of the resin composition and 375 parts of the mixture of sand and naphthalene-disulfonic acid used in Example 5. The properties of the cement obtained corresponded to the properties of the cements described in the preceding examples.

Example 7

60 parts of a furan resin consisting of 70 parts of a condensation product from furfuryl alcohol and 30 parts of furfural were mixed with 40 parts of a condensation product from xylene and formaldehyde having an oxygen content of 17.3% and a sulfur content of less than 0.3%. 100 parts of the resin composition were mixed with 375 parts of quartz sand having a particle size of up to 1 millimeter and containing 3% of naphthalene-disulfonic acid. The cement obtained had the same working time and hardening properties as the cements described above.

Example 8

70 parts of a furyl-acrolein resin obtained by alkaline condensation of furfural with acetaldehyde were mixed with 30 parts of a condensation product from 70 parts of xylene and 30 parts of o-cresol with formaldehyde. The condensation product from xylene, cresol and formaldehyde had an oxygen content of 22% and a sulfur content of less than 0.3%.

The properties of the resin composition corresponded to the properties of the composition of Example 3. Hardening could be brought about either in the cold with p-toluenesulfonic acid or in the heat with p-toluenesulfonic acid ethyl ester. When temperatures above 150° C. were applied a hardener need not be added.

What is claimed is:

1. A hardenable composition of matter consisting essentially of a mixture of:
   (A) 90–60% by weight of a furan condensation resin selected from at least one member of the group consisting of furfuryl alcohol, furfural, furfural with an aldehyde and furyl acrolein and
   (B) 10–40% by weight of a condensation product of a mono- or binuclear aromatic hydrocarbon with formaldehyde having an oxygen content of at least 5% and a sulfur content of less than 0.3%.

2. The composition of claim 1, wherein component B is a condensation product of a mono- or binuclear aromatic hydrocarbon with formaldehyde, to which are added 0–30 parts by weight of a phenol.

3. The composition of claim 1, which, in addition, contains a filler.

4. The composition of claim 1, wherein component A is a furfuryl alcohol condensation product.

5. The composition of claim 1, wherein component A is a condensation product of furfuryl alcohol and furfural.

6. The composition of claim 1, wherein component A is a condensation product of furfural with acetaldehyde.

7. The composition of claim 1, wherein component B is a toluene formaldehyde condensation product.

8. The composition of claim 1, wherein component B is a xylene formaldehyde condensation product.

9. The composition of claim 1, wherein component B is a mesitylene formaldehyde condensation product.

10. The composition of claim 1, wherein component B is a condensation product of 90 parts by weight of xylene and 10 parts by weight of 4,4'-dihydroxy-2,2-diphenyl-propane.

References Cited

UNITED STATES PATENTS

| | | | |
|---|---|---|---|
| 3,053,793 | 9/1962 | Imoto et al. | 260—838 |
| 3,057,026 | 10/1962 | Blaies et al. | 260—829 |
| 3,063,959 | 11/1962 | Lorentz | 260—838 |
| 3,165,558 | 1/1965 | Imoto et al. | 260—823 |

GEORGE F. LESMES, *Primary Examiner.*

MURRAY TILLMAN, *Examiner.*

J. C. BLEUTGE, *Assistant Examiner.*